(12) United States Patent
Lu et al.

(10) Patent No.: US 12,179,092 B2
(45) Date of Patent: Dec. 31, 2024

(54) GAME CONTROLLER

(71) Applicant: DEXIN CORP., New Taipei (TW)

(72) Inventors: Ho Lung Lu, New Taipei (TW);
Min-Chien Chang, New Taipei (TW)

(73) Assignee: DEXIN CORP., New Taipei (TW)

( * ) Notice: Subject to any disclaimer, the term of this patent is extended or adjusted under 35 U.S.C. 154(b) by 199 days.

(21) Appl. No.: 17/856,807

(22) Filed: Jul. 1, 2022

(65) Prior Publication Data

US 2023/0105605 A1 Apr. 6, 2023

Related U.S. Application Data

(60) Provisional application No. 63/252,556, filed on Oct. 5, 2021.

(30) Foreign Application Priority Data

Mar. 25, 2022 (TW) .................................. 111111444

(51) Int. Cl.
*A63F 13/24* (2014.01)
*A63F 13/92* (2014.01)

(52) U.S. Cl.
CPC .............. *A63F 13/24* (2014.09); *A63F 13/92* (2014.09)

(58) Field of Classification Search
CPC .................................. A63F 13/24; A63F 13/92
See application file for complete search history.

(56) References Cited

U.S. PATENT DOCUMENTS

| | | | | |
|---|---|---|---|---|
| 6,530,838 B2* | 3/2003 | Ha | .......................... | A63F 13/24 345/169 |
| 7,833,097 B1* | 11/2010 | Maddox | ................... | A63F 13/23 463/47 |
| 9,539,507 B2* | 1/2017 | Schoenith | ............... | A63F 13/24 |
| 9,778,778 B2* | 10/2017 | Helmes | .................... | A63F 13/24 |
| 10,328,350 B2* | 6/2019 | Furuike | ................. | A63F 13/235 |
| 11,167,209 B2* | 11/2021 | Lu | ........................... | A63F 13/98 |
| 11,202,963 B2* | 12/2021 | Esselstrom | ............... | F16B 2/12 |
| 11,504,613 B2* | 11/2022 | Lu | ........................... | A63F 13/98 |
| 2002/0155890 A1* | 10/2002 | Ha | .......................... | A63F 13/23 463/36 |
| 2004/0213405 A1* | 10/2004 | Wilcox | ................... | H04M 1/04 379/455 |
| 2005/0078086 A1* | 4/2005 | Grams | .................... | A63F 13/24 345/158 |

(Continued)

FOREIGN PATENT DOCUMENTS

EP 1380324 A1 * 1/2004 ............. A63F 13/06

*Primary Examiner* — Steve Rowland
(74) *Attorney, Agent, or Firm* — Maschoff Brennan (57) ABSTRACT

A game controller configured for a mobile device. The game controller includes a connection mechanism, two control handles, and at least one first pad. The control handles are respectively coupled to two opposite sides of the connection mechanism. Each of the two control handles has an accommodation recess, and the two accommodation recesses of the two control handles are configured to accommodate the mobile device. The first pad is removably disposed on one of the two control handles and located in the accommodation recess of the one of the two control handles, and the at least one first pad is configured to be located between and clamped by the mobile device and the one of the two control handles.

9 Claims, 9 Drawing Sheets

(56) References Cited

U.S. PATENT DOCUMENTS

| | | | | |
|---|---|---|---|---|
| 2013/0157764 A1* | 6/2013 | Joynes | ............... | A63F 13/23 |
| | | | | 463/37 |
| 2013/0184077 A1* | 7/2013 | Galpern | ............... | A63F 13/24 |
| | | | | 463/37 |
| 2014/0243054 A1* | 8/2014 | LaColla | ............... | H04B 1/3888 |
| | | | | 455/575.8 |
| 2015/0281422 A1* | 10/2015 | Kessler | ............... | H04M 11/007 |
| | | | | 455/557 |
| 2020/0398171 A1* | 12/2020 | McDole | ............... | A63F 13/98 |
| 2021/0275907 A1* | 9/2021 | Khaira | ............... | A63F 13/92 |

* cited by examiner

GAME CONTROLLER

CROSS-REFERENCE TO RELATED APPLICATIONS

This non-provisional application claims priority under 35 U.S.C. § 119(a) on provisional patent application No(s). 63/252,556 filed in U.S.A. on Oct. 5, 2021, and on patent application No(s). 111111444 filed in Taiwan, R.O.C. on Mar. 25, 2022, the entire contents of which are hereby incorporated by reference.

TECHNICAL FIELD

The disclosure relates to a game controller, more particularly to a game controller which is applied to a mobile device.

BACKGROUND

As the progress of a mobile phone (e.g., an iPhone or Android phone) with a touch screen, mobile games become more and more popular. Some mobile games gain more profit than traditional video games or computer games.

In order to enhance user experience during playing the mobile games, some developers provide external game controllers cooperating with the mobile phones. When a mobile phone is installed onto a game controller, an electrical connector of the game controller is inserted into an electrical jack of the mobile phone for building a signal communication between the game controller and the mobile phone. However, a length of the electrical connector of the game controller is constant and merely suitable for the mobile phone without a protective casing. Therefore, when the mobile phone with the protective casing are installed on the game controller, the total length of the mobile phone with the protective casing may cause an unsuccessful connection between the electrical connector of the game controller and the electrical jack of the mobile phone. In other words, the existing game controller is not designed for both cases where the mobile phone is with and without the protective casing.

SUMMARY

The disclosure provides a game controller which is suitable for both cases where the mobile phone is with and without the protective casing.

One embodiment of the disclosure provides a game controller configured for a mobile device. The game controller includes a connection mechanism, two control handles, and at least one first pad. The control handles are respectively coupled to two opposite sides of the connection mechanism. Each of the two control handles has an accommodation recess, and the two accommodation recesses of the two control handles are configured to accommodate the mobile device. The first pad is removably disposed on one of the two control handles and located in the accommodation recess of the one of the two control handles, and the at least one first pad is configured to be located between and clamped by the mobile device and the one of the two control handles.

According to the game controller as discussed in the above embodiment, by adding or removing pads or modifying the position of the pads, users can adjust the size of the unoccupied space in the accommodation recess configured to accommodate the mobile device. Therefore, the game controller can satisfy the cases of the mobile device with or without the protective case.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

In this embodiment, the game controller includes a connection mechanism, two control handles and two first pads. Moreover, the game controller may further include two second pads, two third pads, two fourth pads, two fifth pads, and an electrical connector. Since the two first pads, the two second pads, the two third pads, the two fourth pads, and the two fifth pad are respectively and symmetrically disposed on the two control handles, for the convenience of the illustration, the figures and the following descriptions merely introduce one of the control handles and the pads thereon; that is, the quantities of the first pads, the second pads, the third pads, the fourth pads, and the fifth pads each are two, but for the convenience of the illustration, the figures and the following descriptions merely introduce one first pad, one second pad, one third pad, one fourth pad, and one fifth pad.

Figure 1:
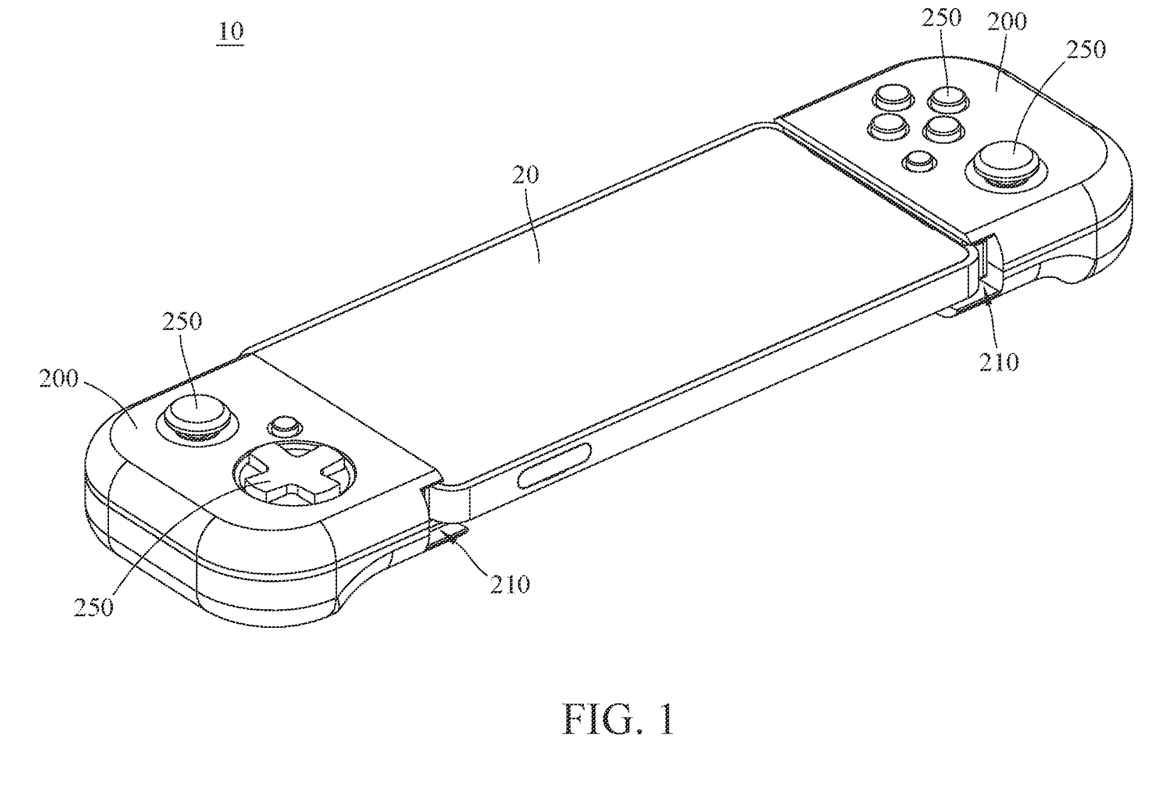
FIG. 1 is a perspective view of a game controller according to a first embodiment of the disclosure and a mobile device.
Figure 2:
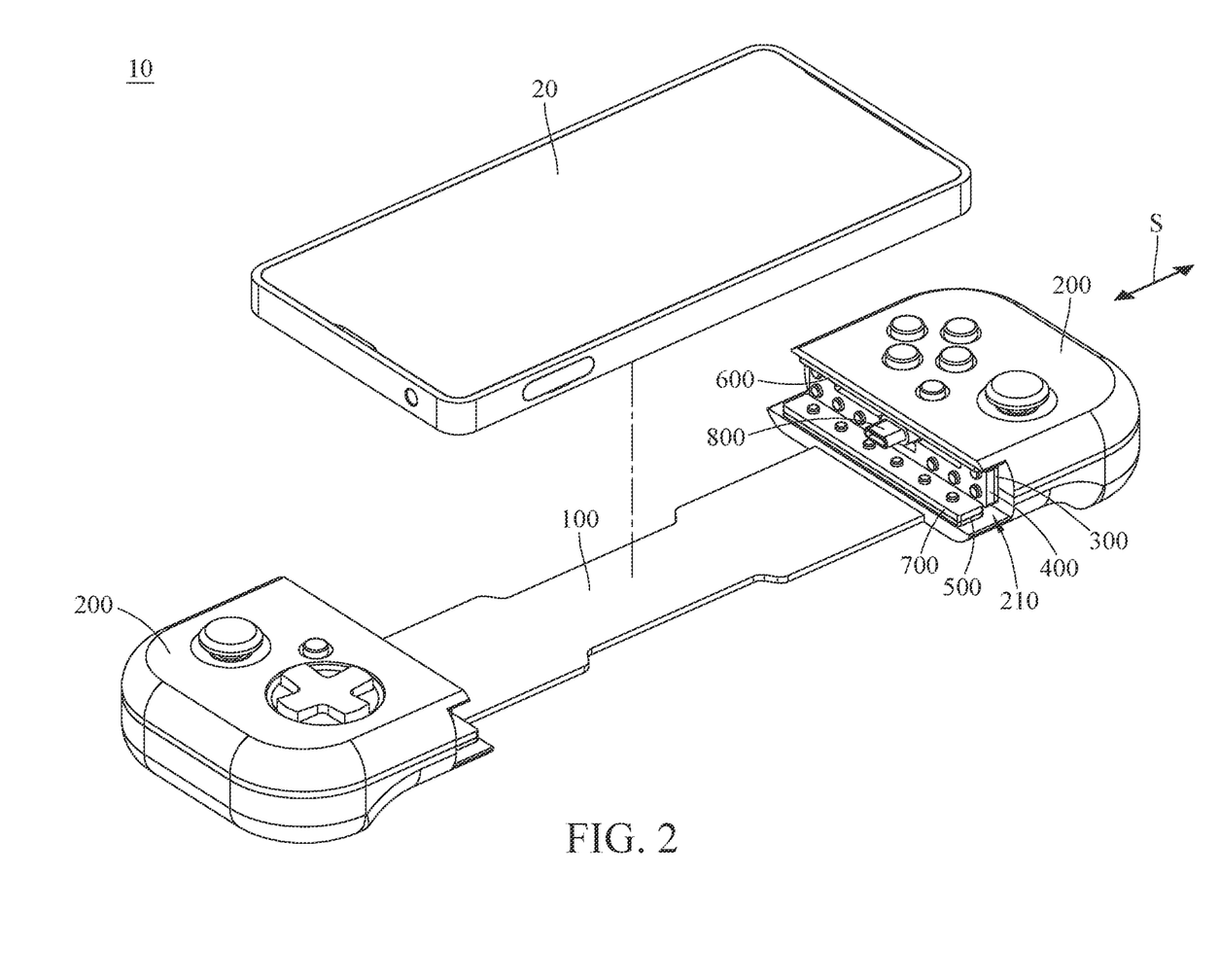
FIG. 2 is an exploded view of the game controller and the mobile device in FIG. 1.
Figure 3:
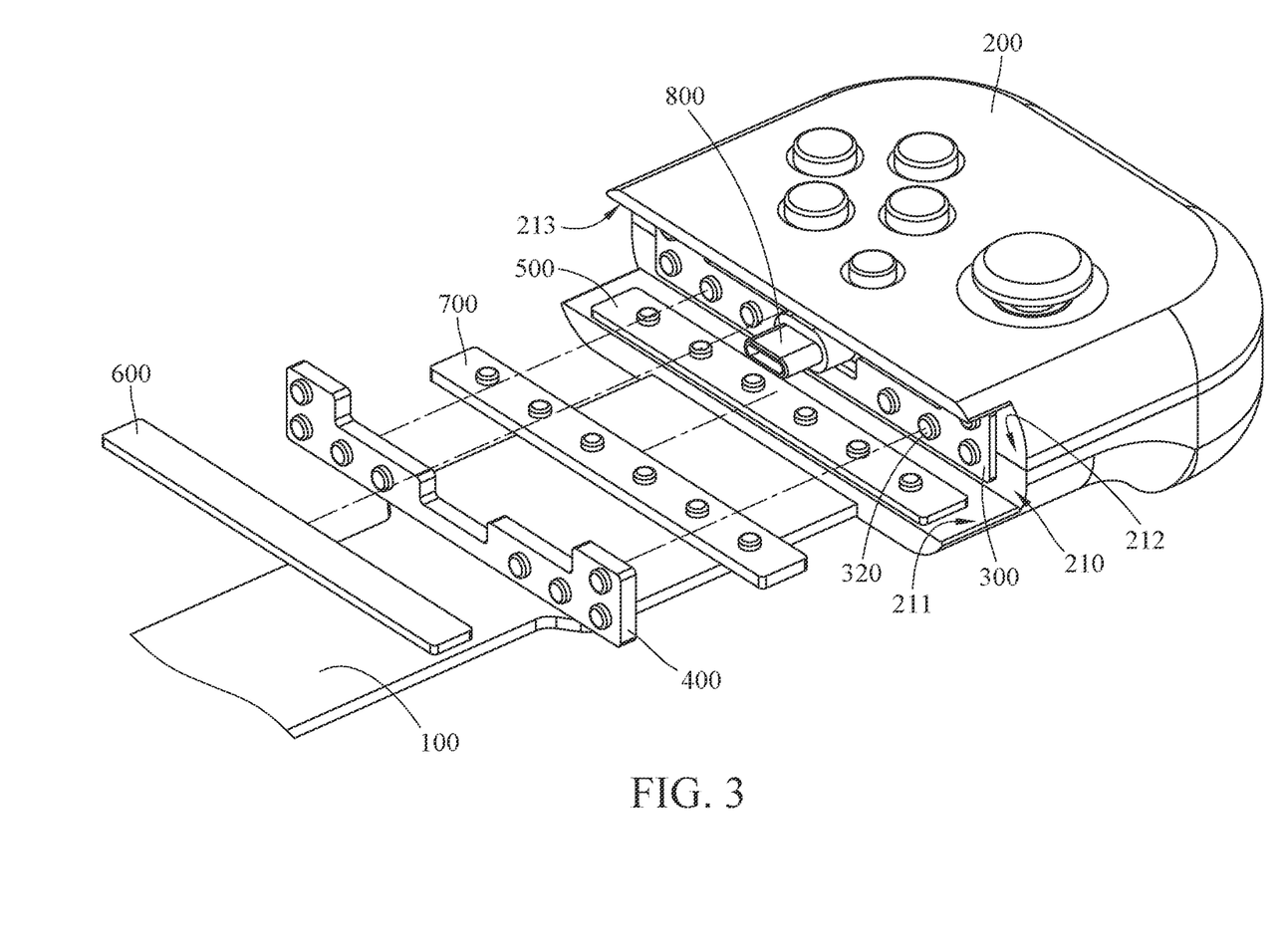
FIG. 3 is a partial exploded view of the game controller in FIG. 2.
Figure 4:
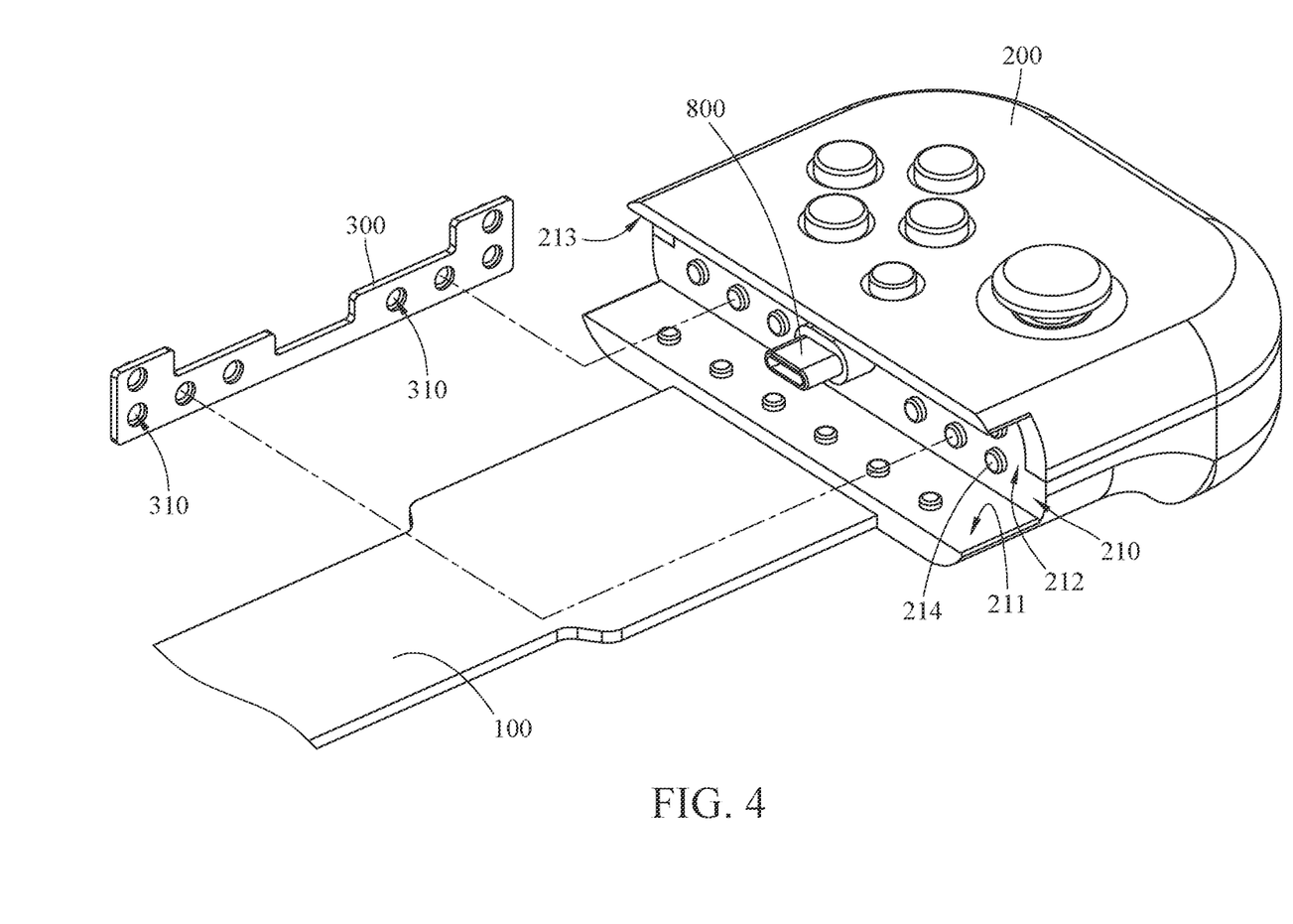
FIG. 4 is a partial exploded view of the game controller in FIG. 2 when a first pad is removed from a control handle.

Refer to FIGS. 1 to 4, where FIG. 1 is a perspective view of a game controller 10 according to a first embodiment of the disclosure and a mobile device 20, FIG. 2 is an exploded view of the game controller 10 and the mobile device 20 in FIG. 1, FIG. 3 is a partial exploded view of the game controller 10 in FIG. 2, and FIG. 4 is a partial exploded view of the game controller 10 in FIG. 2 when a first pad 300 is removed from a control handle 200.

In this embodiment, the game controller 10 is configured for the mobile device 20. The mobile device 20 is, for example, a smart phone or a tablet computer. Each of the control handles 200, for example, has a plurality of control buttons 250 for controlling gaming in the mobile device 20. The two control handles 200 are respectively coupled to two opposite sides of the connection mechanism 100, and each of the control handles 200 has an accommodation recess 210. The accommodation recesses 210 are configured to respectively accommodate two opposite sides of the mobile device 20 for the installation of the mobile device 20 on the game controller 10. Signals between the control handles 200 can be transmitted via a wire manner or a wireless manner. When the signals between the control handles 200 are transmitted via a wire manner, wires for transmitting the signals between the control handles 200 may be arranged in the connection mechanism 100.

The first pad 300, the second pad 400, the third pad 500, the fourth pad 600, and the fifth pad 700 are located in the accommodation recess 210 and are removably mounted on the control handle 200. Therefore, by adding or removing pads or modifying the position of the pads can adjust the size of the unoccupied space in the accommodation recess 210 that is configured to accommodate the mobile device 20. Specifically, the control handle 200 has a bottom surface 211, a side surface 212, and a top surface 213 that together form the accommodation recess 210, where the side surface 212 connects the bottom surface 211 with the top surface 213. The first pad 300 is removably mounted on the side surface 212. The second pad 400 is removably mounted on the first pad 300. The third pad 500 is removably mounted on the bottom surface 211. The fourth pad 600 is removably mounted on the top surface 213. The fifth pad 700 is removably mounted on the third pad 500.

In this embodiment, the first pad 300 is mounted on the control handle 200, for example, via an engagement manner. Specifically, the control handle 200 has a plurality of engagement protrusions 214, and the engagement protrusions 214 protrude from the bottom surface 211, the side surface 212, and the top surface 213. The first pad 300 has a plurality of engagement recesses 310 and a plurality of engagement protrusions 320. The engagement recesses 310 of the first pad 300 are engaged with the engagement protrusions 214 of the control handle 200. Therefore, the first pad 300 is mounted on the control handle 200 via a manner similar to the manner assembling two pieces of LEGO. Similarly, the installation of other pads can be done by the same manner.

Note that the installation manner of the first pad 300 or other pads is not restricted to the engagement manner in the disclosure and may be modified to another manner, such as an adhering manner or a magnetic attraction manner.

The electrical connector 800 is slidably disposed on one of the two control handles 200, and the electrical connector 800 is slidable relative to the control handle 200 along a direction S to stick out of the side surface 212 so as to be partially located in the accommodation recess 210 or to remove from the accommodation recess 210.

In this embodiment, the game controller 10 includes the first pad 300, the second pad 400, the third pad 500, the fourth pad 600, and the fifth pad 700, but the disclosure is not limited thereto; in some other embodiments, the game controller may include only one of the first pad to the fifth pad.

Figure 5:
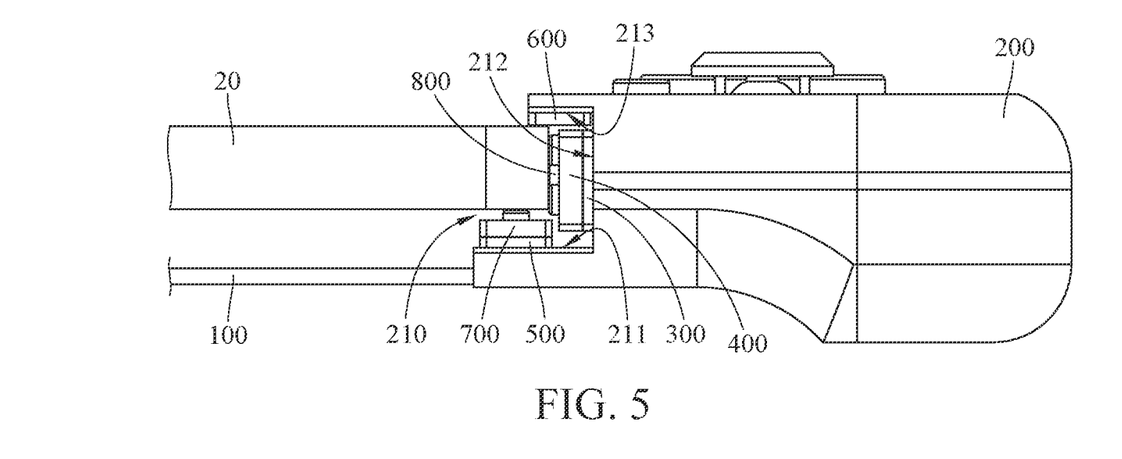
FIG. 5 shows a side view illustrating that the mobile device without a protective casing is mounted on the game controller in FIG. 2.
Figure 6:
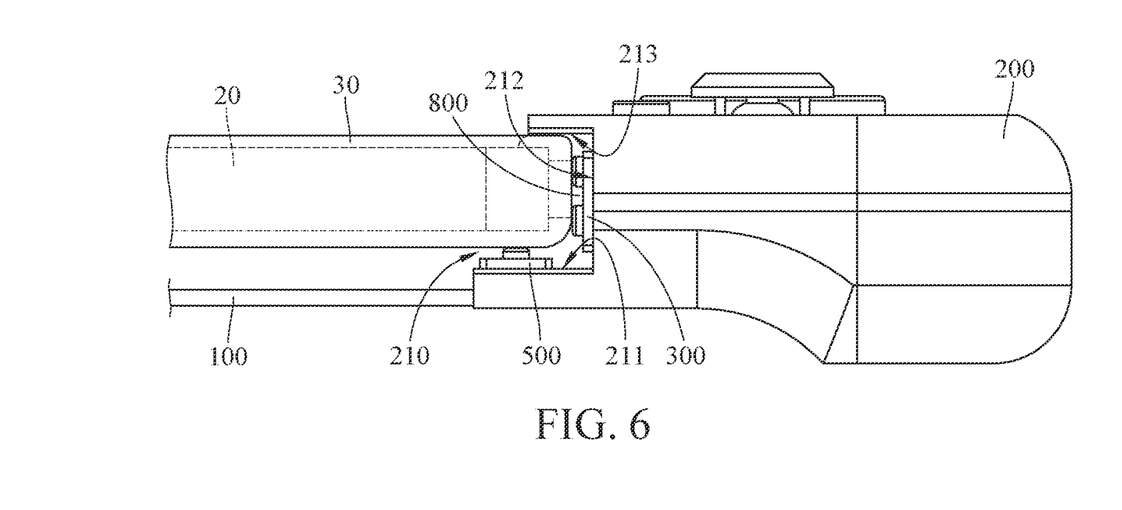
FIG. 6 shows a side view illustrating that the mobile device with a protective casing is mounted on the game controller in FIG. 2.

Refer to FIGS. 5 and 6, FIG. 5 shows a side view illustrating that the mobile device 20 without a protective casing is mounted on the game controller 10 in FIG. 2, and FIG. 6 shows a side view illustrating that the mobile device 20 with a protective casing 30 is mounted on the game controller 10 in FIG. 2.

As shown in FIG. 5, when the mobile device 20 without any protective case is to be mounted on the game controller 10, all of the first pad 300, the second pad 400, the third pad 500, the fourth pad 600, and the fifth pad 700 are preliminarily mounted on the control handle 200 for allowing the unoccupied space in the accommodation recess 210 to fit the size of the mobile device 20. By doing so, the mobile device 20 without any protective case can be firmly fixed to the game controller 10.

As shown in FIG. 6, when the mobile device 20 with a protective case 30 is to be mounted on the game controller 10, the second pad 400, the fourth pad 600, and the fifth pad 700 can be removed from the control handle 200, and the first pad 300 and the third pad 500 are remained to be mounted on the control handle 200, such that the unoccupied space in the accommodation recess 210 can fit the size of the mobile device 20 with the protective casing 30. By doing so, the mobile device 20 with the protective case 30 can also be firmly fixed to the game controller 10.

As a result, it can be understood that by adding or removing pads or modifying the position of the pads, users can adjust the size of the unoccupied space in the accommodation recess 210 configured to accommodate the mobile device 20. Therefore, the game controller 10 can satisfy the cases of the mobile device 20 with or without the protective case 30.

Figure 7:
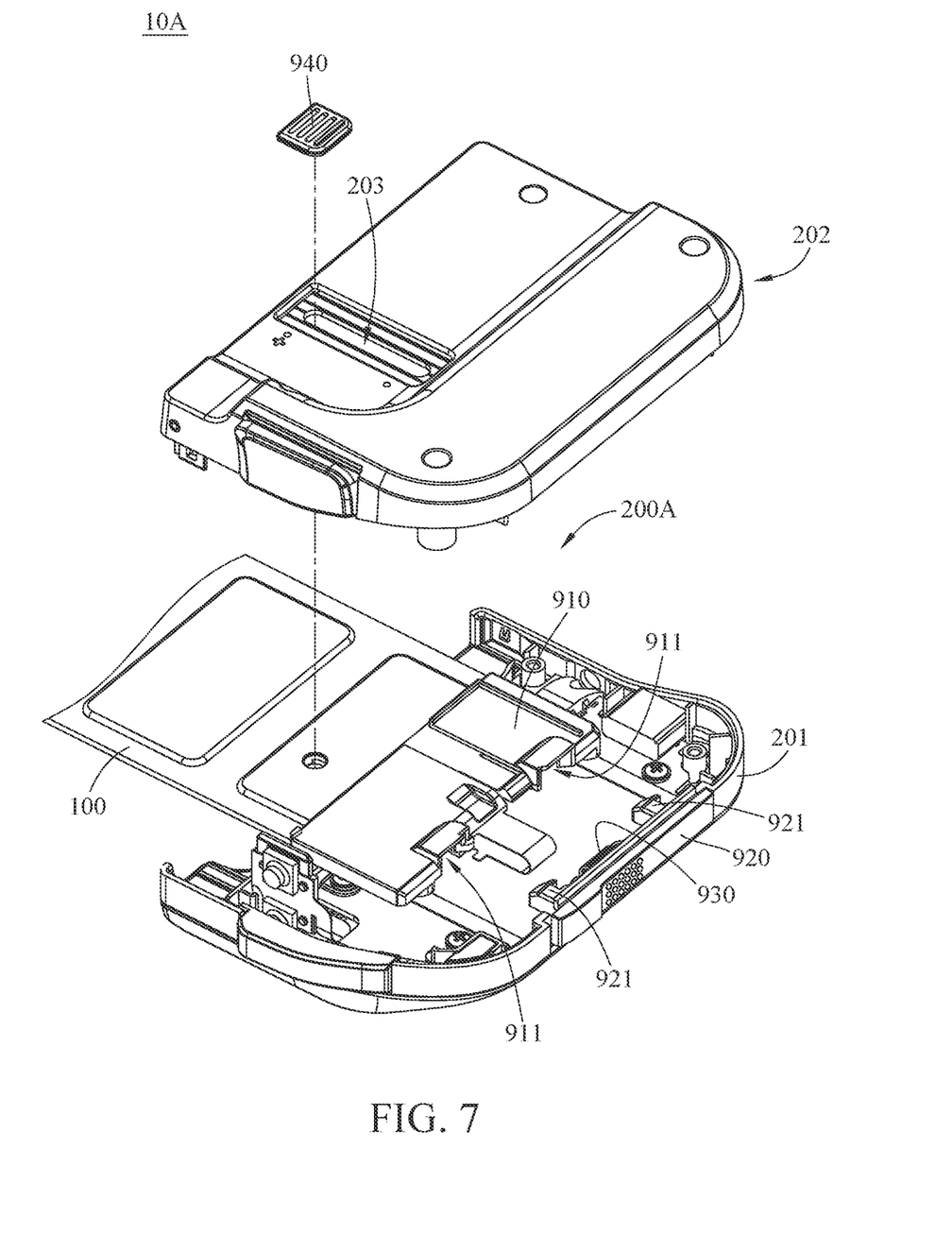
FIG. 7 is a partial exploded view of a game controller according to a second embodiment of the disclosure.

Refer to FIG. 7, where FIG. 7 is a partial exploded view of a game controller 10A according to a second embodiment of the disclosure.

In this embodiment, the game controller 10A includes a control handle 200 located at one side of a connection mechanism 100. The control handle 200 includes a first casing 201, a second casing 202, a slidable component 910, an engagement component 920, an elastic component 930, and a slide button 940. The second casing 202 is assembled with the first casing 201. The slidable component 910 is mounted on the connection mechanism 100 and slidably disposed on the first casing 201, such that the connection mechanism 100 is slidable relative to the first casing 201. The engagement component 920 is slidably disposed on the control handle 200 on which the slidable component 910 is disposed. A slidable direction of the engagement component 920 is different from a slidable direction of the slidable component 910, and an engagement portion 921 of the engagement component 920 is configured to be engaged with an engagement recess 911 of the slidable component 910 so as to fix the slidable component 910 in one specific position. The elastic component 930 is, for example, an extension spring, and one end of the elastic component 930 is fixed to the first casing 201, and another end of the elastic component 930 is fixed to the engagement component 920, such that the engagement component 920 is maintained in the position where the engagement component 920 is engaged with the slidable component 910 when there is no other forces exerted on the engagement component 920. The slide button 940 is fixed to the connection mechanism 100 and is slidably located in a groove 203 of the second casing 202, such that the slide button 940 can be operated to move the first casing 201 and the second casing 202.

Figure 8:
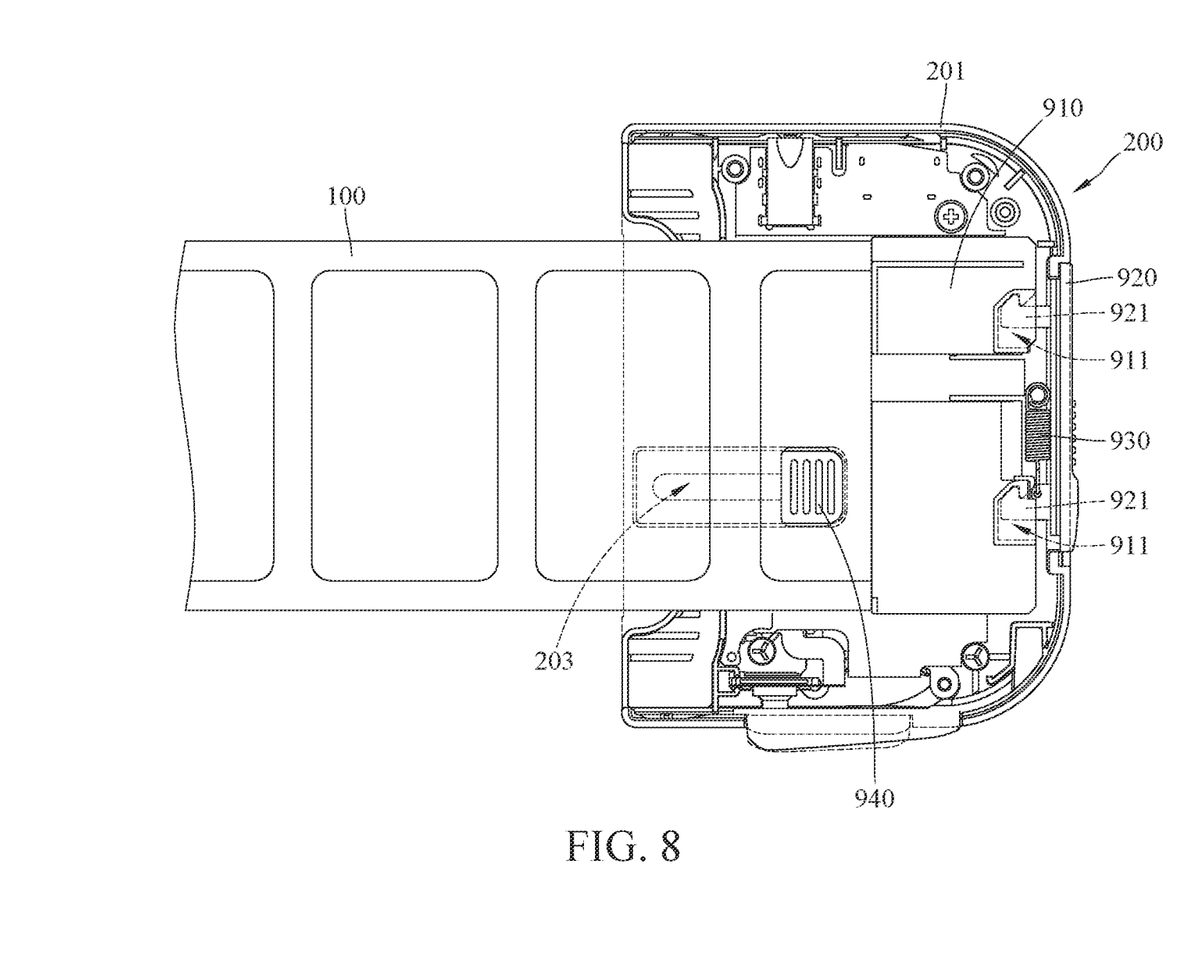
FIGS. 8 to 10 show an operation of the game controller in FIG. 7.
Figure 9:
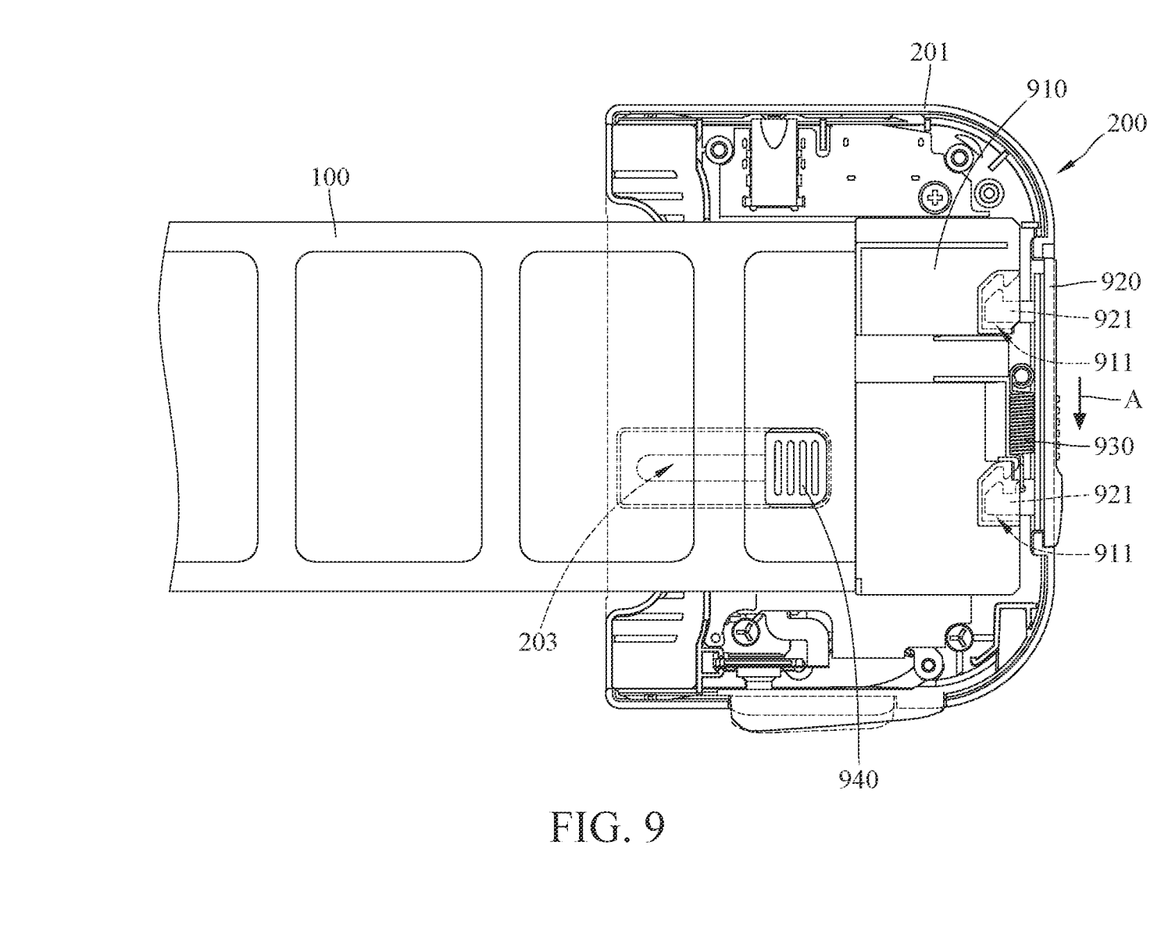
Figure 10:
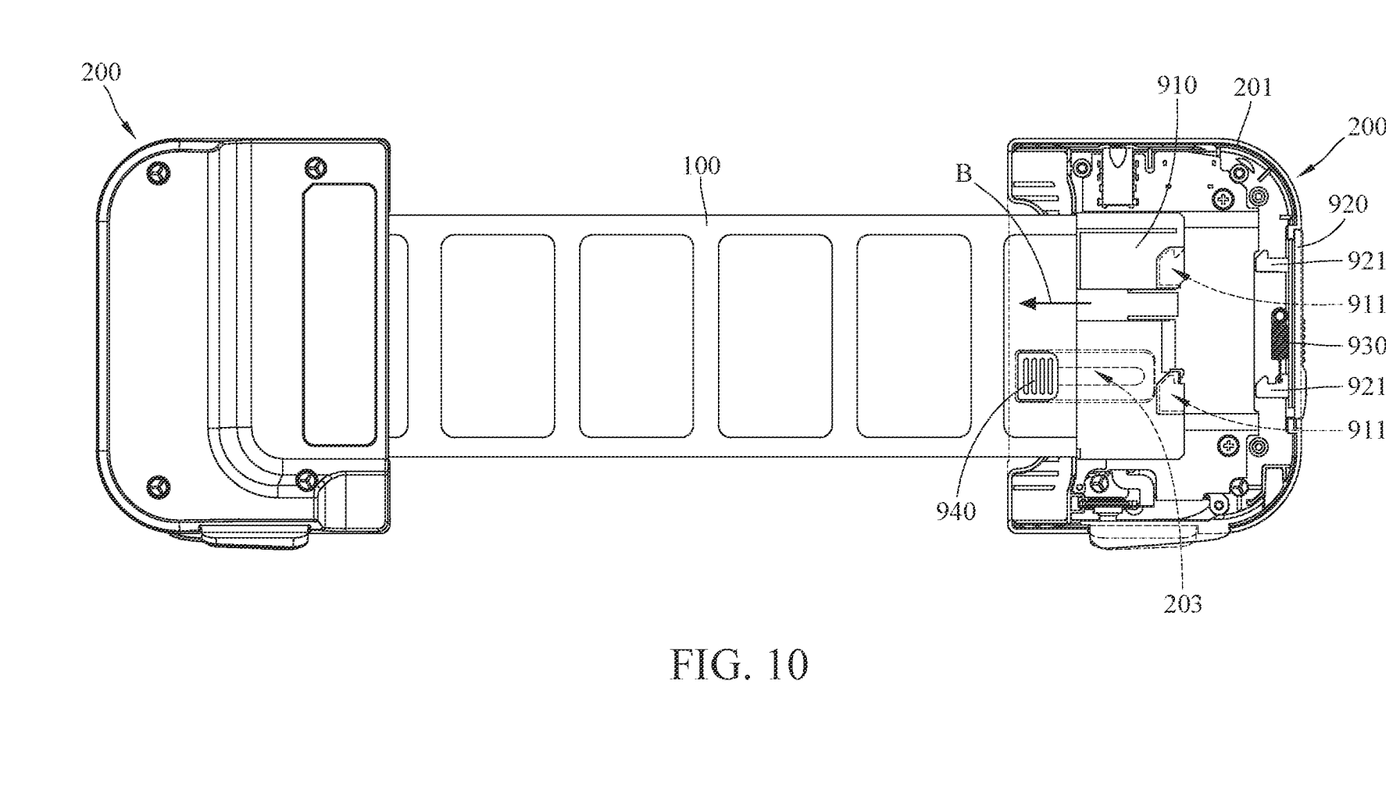

Refer to FIGS. 8 to 10, where FIGS. 8 to 10 show an operation of the game controller 10A in FIG. 7. As shown in FIG. 8, the engagement component 920 is engaged with the slidable component 910. Then, as shown in FIG. 9, the engagement component 920 is moved along a direction A to disengage the engagement component 920 from the slidable component 910. Then, as shown in FIG. 10, when the engagement component 920 is disengaged from the slidable component 910, the slidable component 910 can be moved along a direction B relative to the first casing 201 to increase a distance between the control handles 200. On the other hand, when the distance between the control handles 200 is to be shortened, the slide button 940 can be moved along a direction opposite to the direction B, such that the slidable component 910 can be engaged with the engagement component 920 again.

According to the game controllers as discussed in the above embodiments, by adding or removing pads or modifying the position of the pads, users can adjust the size of the unoccupied space in the accommodation recess configured to accommodate the mobile device. Therefore, the game controller can satisfy the cases of the mobile device with or without the protective case.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A game controller, configured for a mobile device, comprising:
   a connection mechanism;
   two control handles, respectively coupled to two opposite sides of the connection mechanism, wherein each of the two control handles has an accommodation recess, and the two accommodation recesses of the two control handles are configured to accommodate the mobile device; and
   at least one first pad, removably disposed on one of the two control handles and located in the accommodation recess of the one of the two control handles, wherein the at least one first pad is configured to be located between and clamped by the mobile device and the one of the two control handles;
   wherein each of the two control handles has a bottom surface, a side surface, and a top surface which together form the accommodation recess, the side surface connects the bottom surface with the top surface, and the at least one first pad is removably mounted on the side surface of the one of the two control handles.

2. The game controller according to claim 1, further comprising at least one second pad removably mounted on the at least one first pad.

3. The game controller according to claim 2, further comprising at least one third pad removably mounted on the bottom surface of the one of the two control handles.

4. The game controller according to claim 3, further comprising at least one fourth pad removably mounted on the top surface the one of the two control handles.

5. The game controller according to claim 1, further comprising an electrical connector, wherein the electrical connector is slidably disposed on one of the two control handles, and the electrical connector is configured to stick out of the side surface so as to be partially located in the accommodation recess or configured to be removed from the accommodation recess.

6. The game controller according to claim 1, further comprising:
   a slidable component, mounted on the connection mechanism and slidably disposed on one of the two control handles;
   an engagement component, slidably disposed on the one of the two control handles on which the slidable component is disposed, wherein a slidable direction of the engagement component is different from a slidable direction of the slidable component, and the engagement component is configured to engage with the slidable component for fixing the slidable component in one position.

7. The game controller according to claim 1, further comprising an electrical connector slidably disposed on one of the two control handles.

8. A game controller, configured for a mobile device, comprising:
   a connection mechanism;
   two control handles, respectively coupled to two opposite sides of the connection mechanism, wherein each of the two control handles has an accommodation recess, and the two accommodation recesses of the two control handles are configured to accommodate the mobile device; and
   at least one first pad, removably disposed on one of the two control handles and located in the accommodation recess of the one of the two control handles, wherein the at least one first pad is configured to be located between and clamped by the mobile device and the one of the two control handles;
   wherein the at least one first pad is mounted on the one of the two control handles via an engagement manner.

9. A game controller, configured for a mobile device, comprising:
   a connection mechanism;
   two control handles, respectively coupled to two opposite sides of the connection mechanism, wherein each of the two control handles has an accommodation recess, and the two accommodation recesses of the two control handles are configured to accommodate the mobile device; and
   at least one first pad, removably disposed on one of the two control handles and located in the accommodation recess of the one of the two control handles, wherein the at least one first pad is configured to be located between and clamped by the mobile device and the one of the two control handles;
   wherein each of the two control handles has a plurality of engagement protrusions, the at least one first pad has a plurality of engagement recesses, and the plurality of engagement recesses of the at least one first pad are respectively engaged with the plurality of engagement protrusions of the one of the two control handles.

* * * * *